Patented Apr. 11, 1950

2,503,842

UNITED STATES PATENT OFFICE 2,503,842

CYCLOPENTANOPOLYHYDROPHENANTHRENES AND PROCESS OF MAKING SAME

Tadeus Reichstein, Basel, Switzerland

No Drawing. Original application February 4, 1943, Serial No. 474,726. Divided and this application February 27, 1946, Serial No. 650,732. In Switzerland April 25, 1942

5 Claims. (Cl. 260—239.5)

It has been found that compounds of the cyclopentanopolyhydrophenanthrene series containing oxygen, or groups including oxygen, in ring C, can be produced by treating compounds of this series, containing a nuclear double bond in which the carbon atom 11 participates, with agents capable of eliminating this double bond with production of addition compounds, in which an oxidic oxygen is attached to the carbon atoms 11 and 12 or the carbon atoms 9 and 11 and, if desired, reacting the products obtained with oxidixing and/or reducing agents, or agents which effect isomerization of an oxide grouping into the keto form. The products obtained in this way may subsequently be treated with hydrolyzing, esterifying, oxidizing, reducing or halogenizing reagents or agents which eliminate hydrohalide, either singly or in combination, in any order of succession.

The compounds mentioned above which are unsaturated in ring C are obtained, for example, according to the process described in U. S. patent applications No. 433,072, now abandoned, and 435,570 (U. S. Patent No. 2,409,798) from the corresponding compounds containing, for instance in the 12 position, a free or substituted hydroxyl group; or by degradation of the side chain as described in U. S. Patent No. 2,387,706. The remaining rings of the nucleus are saturated or unsaturated. The starting products may further be substituted in any way, e. g. in the 3, 7 and/or 17 position. The following compounds may for example be used: $\Delta^{11,12}$-3-hydroxy-cholenic acid, $\Delta^{11,12}$-3-keto-cholenic acid, $\Delta^{11,12}$-3,7-dihydroxy-cholenic acid, $\Delta^{5:6,11:12}$-3-hydroxy-choladienic acid, $\Delta^{5:6,11:12}$-3-keto-choladienic acid, $\Delta^{11,12}$-pregnen-3 20-dione, $\Delta^{4:5,11:12}$-pregnadiene-3,20-dione, $\Delta^{11,12}$-etiocholene-3,17-dione, $\Delta^{4:5,11:12}$-etio-choladiene-3,17-dione, the lower homologues of the above acids as, for example, $\Delta^{11,12}$-3-hydroxy-etio-cholenic acid or $\Delta^{11,12}$-3-keto-etiocholenic acid or the corresponding nor-cholenic acid or bisnor-cholenic acid. The corresponding derivatives esterified in the hydroxyl and/or carboxyl groups and analogous compounds unsaturated in the 9,11 position may also be used.

The starting materials containing a double bond in ring C in which the carbon atom 11 participates are treated, according to the present process, with agents capable of forming, with removal of this double bond, addition compounds in which an oxidic oxygen is attached to the carbon atoms 11 and 12 or the carbon atoms 9 and 11. In particular therefore, oxidizing agents are used which are capable of adding oxygen or groups including oxygen to the double bond, e. g. peroxides such as hydrogen peroxide or per-acids, metal oxides such as osmium tetroxide or vanadic acid, if desired in the presence of chlorates; further permanganates, lead tetra-acylates, aryl iodoso-acylates or a halogen-silver benzoate complex. Hypohalogenous acids, their salts, ethers or esters, or substances which give off hypohalogenous acids in the presence of water, e. g. bromacetamide or toluene-sulpho-chloramine, may be used instead of the oxidizing agents mentioned, particularly when starting from 11,12 unsaturated compounds.

Halo-hydrins obtained can be subsequently converted into oxides by the action of substances which split off hydrohalide, e. g. alkaline substances, in particular aluminium oxide. In this way oxides are generally obtained which are stereoisomers of those prepared directly by the action of peroxides on the unsaturated starting materials.

Oxide groups can be split up with reducing agents e. g. with amalgams, with metal alcoholates or phenolates such as those of aluminium or magnesium, in the presence of secondary alcohols, with alkali metals and alcohols, with catalytically activated (e. g. by metals) hydrogen, or by electrolytic or biochemical means. Oxide groups may also be converted directly into keto groups by using the known methods which effect isomerization of an oxide into the keto form, e. g. with dilute aqueous or alcoholic acids or alkalis, zinc chloride or concentrated acids such as 80% phosphoric acid.

Halogen atoms which have been introduced, as for example in the halohydrins, can also be removed by means of suitable reducing agents, e. g. zinc and glacial acetic acid. Advantageously, prior to this reduction adjacent free hydroxyl groups which may be present, are converted into keto groups. The oxidizing or equivalent dehydrogenating agents suitable for this purpose are well known.

The products may subsequently be further converted in a known way, by esterification, saponification, oxidation or dehydrogenation, reduction, halogenation, elimination of acid, or a combination of these reactions in any order of succession. For example partially esterified glycols, e. g. glycol-mono-acylates or halo-hydrins may be directly converted in known way into ketones, by treatment with agents eliminating acid, such as finely divided metals (in particular zinc) in inert diluents, or with suitable reagents which eliminate hydrohalide. The formation of ketones in this reaction presumably is attributable to the already mentioned isomerizing ability of ring oxides intermediately formed.

By the present process there may be thus obtained the following intermediate and final products: Compounds of the cyclopentanopolyhydrophenanthrene series (among others saturated ones in which the rings A and B are linked together in cis-position), which contain, instead of the initial double bond in ring C, a free or esterified hydroxyl group, attached to the carbon atom 11 and a halogen atom at the carbon atom 12, or an oxidic oxygen attached to the carbon atoms 11 and 12, or a keto group in 11-position. Compounds of this type have been described formerly in the literature as obtained by transformation and degradation of aglucones with cardiac activity like digoxigenin. It has been shown recently that the original hydroxyl group in ring C of the latter compounds is not located in 11 position, so that all the described corresponding transformation and degradation products cannot have the claimed constitution with a substituent in 11-position. Saturated compounds of the said configuration in reality were obtained for the first time according to the present process. Other products obtained by this process contain at both the carbon atom 11 and a nuclear carbon atom vicinal thereto, as substituents hydroxyl, esterified hydroxyl (which means also halogen), ketonic oxygen or oxydic oxygen.

Below are given a number of examples of the invention, without thereby limiting it in any way.

Example 1

To 668 mg. of $\Delta^{11,12}$-cholenic acid methyl-ester M. Pt. 59–61° C. (prepared for example from 12-hydroxy-cholenic acid methyl-ester, M. Pt. 120–121° C., by saponification, decomposition by heating in vacuo at 240–300° C. and subsequent methylation) is added a solution of 745 mg. perbenzoic acid in 40 cc. of chloroform and the whole allowed to stand for 12 hours at room temperature. The chloroform is evaporated off in vacuo, the residue dissolved in ether, the solution washed with sodium carbonate solution and water, dried over sodium sulphate and considerably concentrated. When pentane is added, crystallization takes place. After filtering off by suction, washing with pentane and drying, 11,12-oxido-cholanic acid methyl-ester, M. Pt. 96–97° C. is obtained. On recrystallization from methyl alcohol it melts in a pure condition at 97–98° C. Saponification with a solution of potassium carbonate in methyl alcohol gives 11,12-oxido-cholanic acid, M. Pt. 155–157° C.

In an analogous way $\Delta^{11,12}$-3-acetoxy-cholenic acid methyl-ester, M. Pt. 117–118° C., gives 11,12-oxido-3-acetoxy-cholanic acid methyl-ester. If one starts from an esterified $\Delta^{9,11}$-3-hydroxy-cholenic acid, such as $\Delta^{9,11}$-3-acetoxy-cholenic acid methyl-ester (obtained for example by reduction of $\Delta^{9,11}$-3-acetoxy-12-keto-cholenic acid methyl-ester with hydrazine and sodium ethylate) the corresponding 9,11-oxido compounds can be obtained.

The oxido compounds mentioned may be isomerized in known manner to ketones and the latters if desired be reduced to alcohols. On the other side the oxide grouping may be split up by reduction in a known manner to alcohols and the latters subsequently be oxidized, if desired, to ketones.

Example 2

240.7 mg. of $\Delta^{11,12}$-3-keto-cholenic acid (obtainable for example from $\Delta^{11,12}$-3-keto-cholenic acid methyl-ester, M. Pt. 122–124° C., by saponification with 2% caustic alkali in methyl alcohol) are dissolved in 6 cc. of pyridine, stable to permanganate. Then 6.50 cc. of N/10-caustic soda solution are added, so that the solution is just feebly alkaline to phenolphthalein. A solution of 102.2 mg. potassium permanganate (1 mol) in 15 cc. water is then added in eight portions within a period of 2 hours and the reaction mixture finally allowed to stand for 2½ hours. The precipitate is filtered off and washed with a mixture of pyridine and water, the clear filtrate acidified with hydrochloric acid while cooling in ice, and the separated precipitate filtered off by suction and thoroughly washed with water. This precipitate is then dissolved in ether, the ether solution washed once again with water, dried, concentrated down considerably, and an excess of diazomethane added. After 5 minutes the solution is worked up in the usual way and a crude product is obtained which is dissolved in petroleum ether and chromatographed over 6.3 aluminium oxide. In this way, in addition to unchanged parent material, fractions are obtained which, on recrystallization from ether-petroleum ether mixtures and then from aqueous methyl alcohol, give platelets which melt at 105–107.5° C. after marked sintering.

$$[\alpha]_D^{15}=+63.4°\pm2°$$

(concentration 1.372 in methyl alcohol). This substance is a 3-keto-11,12-dihydroxy-cholanic acid methyl-ester.

By splitting off water from this compound, for example by distillation with zinc dust, a diketo-cholanic acid methyl-ester is obtained. In this reaction the 3-keto-11,12-oxide is first formed, which oxide is isomerized into the 3,11-diketo compound. Otherwise by mild oxidation or better by dehydrogenation, for example with a ketone in presence of a metal alcoholate or phenolate, the 11,12-dihydroxy compound yields the 3,11,12-triketo-cholanic acid methyl-ester.

Example 3

1.3 g. of $\Delta^{11,12}$-cholenic acid methyl-ester, M. Pt. 59–61° C., are dissolved in 50 cc. of absolute ether, a solution of 1 g. of osmium tetroxide in 50 cc. of absolute ether is added and the whole allowed to stand for three days at room temperature. The dark solution is then concentrated down at first on a water bath and then in vacuo. The residue is dissolved in 10 cc. of benzene and 50 cc. of alcohol, a hot solution of 2 g. of potassium hydroxide and 2 g. of crystallized sodium sulphite in 12 cc. of water added hot to the solution obtained, and the mixture boiled for 3 hours under reflux. 2 cc. of saturated aqueous saline with 8 cc. of alcohol is then added to the filtered mixture to produce better separation of the flocculent precipitate and the whole boiled for another hour whereby the benzene is allowed to distil off, replacing it with alcohol saturated with sodium chloride. It is then filtered hot and thoroughly washed out with hot alcohol which is saturated with sodium chloride.

To the alkaline filtrates, which should have at the most a yellowish colour, water is added, and then, to prevent frothing, acetic acid until the mixture has a faintly acid reaction to litmus. Then they are completely freed from alcohol in a vacuum. Hydrochloric acid is added until the residue has an acid reaction to congo when it is extracted with ether. The ether solution is washed with some water, dried over sodium sulphate, and a solution of diazomethane in ether added until a permanent yellow colouration is obtained. After 10 minutes, it is washed with aqueous hydrochloric acid, sodium carbonate solution and water, dried over sodium sulphate and evaporated down. There remains a light brown residue, which crystallizes after a few hours.

The crystals are purified by dissolving in a mixture of benzene and petroleum-ether (1:4) and filtering the solution through a column of 30 g. aluminium oxide prepared with petroleum ether. The filtrates obtained with benzene-petroleum ether mixtures (1:1) and, in particular, those obtained with absolute benzene give, on evaporating down, residues which crystallize from a little absolute ether by addition of petroleum ether in colourless needles, M. Pt. 83–85° C., or in bunches of coarse, pointed needles, melting at 103–104° C. They consist of 11,12-dihydroxy-cholanic acid methyl-ester, which forms crystal dimers. The specific rotation of the preparation melting at 83–85° C. is $$[\alpha]_D^{16} = +11.3° \pm 1°$$

(concentration 1.86 in methyl alcohol). The preparation melting at 103–04° C. has an identical specific rotation of $[\alpha]_D^{15} = +12.2° \pm 1°$ (concentration 1.973 in methyl alcohol).

Both preparations prove not to be identical with a presumably stereoisomeric 11,12-dihydroxy-cholanic acid methyl-ester, which is obtained from $\Delta^{11,12}$-cholenic acid by treatment with potassium permanganate and subsequent methylation in an analogous manner to that described in Example 2.

30 mg. of 11,12-dihydroxy-cholanic acid methyl-ester M. Pt. 83.5° C. or 103–104° C. are boiled for 15 minutes with a solution of 8 mg. potassium hydroxide in 0.5 cc. methyl alcohol. Some water is then added, the methyl alcohol removed in vacuo, and the remaining mixture extracted with ether after the addition of hydrochloric acid. The ether solution is washed with water, dried over sodium sulphate, considerably concentrated, and pentane added. The free 11,12-dihydroxy-cholanic acid thus obtained crystallizes in small needles, which collect in aggregates, having a M. Pt. 211–214° C.

100 mg. of 11,12-dihydroxy-cholanic acid methyl-ester, M. Pt. 83–85° C., or 103–104° C. are boiled with 0.6 cc. of acetic anhydride and 1 cc. of pyridine for 8 hours under reflux. The mixture is then evaporated down in vacuo, the residue dissolved in ether, the ether solution washed with hydrochloric acid, sodium carbonate solution and water, dried with sodium sulphate and evaporated down. The residue gives, when recrystallized from methyl alcohol, 11,12-diacetoxy-cholanic acid methyl-ester in colourless rods, M. Pt. 108–110° C., $[\alpha]_D^{13} = +1.5° \pm 1°$ (concentration 1.94 in acetone). By heating this compound with zinc dust in toluene in known manner and subsequent saponification of the product with an alcoholic solution of potassium hydroxide, intermediary formation of an 11,12-oxide group occurs, which oxide is subsequently isomerized, by which reactions finally an 11-keto-cholanic acid is obtained, which after treatment with diazomethane yields a keto-cholanic acid methyl-ester.

If instead of $\Delta^{11,12}$-cholenic acid methyl-ester there are used as starting materials corresponding derivatives, containing an additional hydroxyl, acyloxy or keto group in 3-position of the cholene or etiocholene nucleus, correspondingly substituted products of the said series are obtained.

Example 4

300 mg. of $\Delta^{11,12}$-cholenic acid methyl-ester are dissolved in 60 cc. of acetone, a solution of 222 mg. bromacetamide (2 mols) is added and the whole allowed to stand for 16 hours at room temperature. The acetone is removed in vacuo, water added to the residue and the whole extracted with ether. The ether solution is washed with sodium carbonate solution and water, dried over sodium sulphate and evaporated down. The residue is treated in a column as used for chromatography by aluminium oxide. At first a dibromide, M. Pt. 101.5–103.5° C. is eluted with petroleum ether. The fractions extracted afterwards with petroleum ether and a mixture of petroleum ether and benzene (3:7) give, on recrystallization from aqueous methyl alcohol, the α-oxide, M. Pt. 64.5–65.5° C., which has the formula:

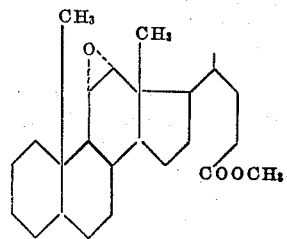

Further eluates probably contain the 9,11-dibromo-12-hydroxy-cholanic acid methyl-ester, as debromination of this product with zinc dust and subsequent oxidation with chromic acid yield the $\Delta^{9,11}$-12-keto-cholenic acid methyl-ester.

The same α-oxide can also be obtained by treating the crude product of the bromacetamide reaction with zinc dust or other agents which eliminate hydrohalide.

86 mg. of the α-oxide described are dissolved in 3 cc. of methyl alcohol, the quantity of Raney catalyst obtained from 300 mg. of alloy is added, and hydrogenation performed during 2½ hours at 100° C. and 120 atmospheres in a rotating autoclave. After filtration the solution is evaporated down, the residue dissolved in ether and the ether solution washed with sodium carbonate solution and water, dried over sodium sulphate and evaporated down. The residue is chromatographed over aluminium oxide. The fractions extracted with petroleum ether crystallize from methyl alcohol and thus give a small quantity of cholanic acid methyl-ester. The 11-hydroxy-cholanic acid methyl-ester, M. Pt. 87–88° C. is eluted with mixtures of benzene and petroleum-ether in the concentrations 1:9 till 3:7. It has the formula:

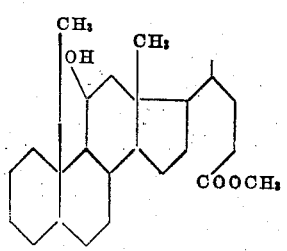

On oxidation with chromic acid in glacial acetic acid it gives, in almost quantitative yield, the 11-keto-cholanic acid methyl-ester, M. Pt. 88° C.

7

Instead of a hydrogenation of the α-oxide with subsequent oxidation, also an isomerization may be performed directly to the ketone in known manner. The latter may afterwards be reduced to the alcohol.

Example 5

500 mg. of Δ$^{11,12}$-3-keto-cholenic acid methyl-ester, M. Pt. 120–122° C., are dissolved in 40 cc. of acetone, a solution of 350 mg. of bromacet-amide (2 mols) in 10 cc. of water is added and the whole allowed to stand for 16 hours at room temperature. After the addition of water, the acetone is removed in vacuo and the residue extracted with ether. The ether solution is washed with dilute sodium carbonate solution and water, dried over sodium sulphate and evaporated down. The residue is treated according to the chromatographic method with 20 g. of aluminium oxide. The eluates with benzene and benzene-ether mixtures (50:1) give the 3-keto-11,12-di-brom-cholanic acid methyl-ester in colourless needles, which melt after recrystallization from ether-petroleum ether, at 136–138° C. by debromination they yield the parent substance. Further fractions extracted with benzene-ether mixtures of increasing ether content, and with pure ether, give the 11,12-α-oxido-3-keto-cholanic acid methyl-ester which melts, on recrystallization from petroleum ether, at 122–124° C. It has the formula:

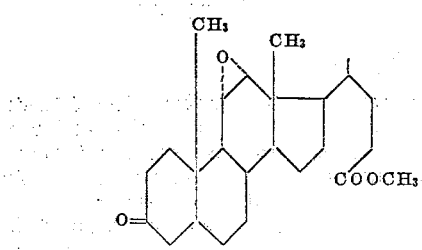

The further fractions eluted with ether-methyl alcohol (9:1) give on oxidation with chromic acid and debromination with zinc dust, Δ$^{9,12}$-3,12-diketo-cholenic acid methyl-ester.

The oxide described yields, on hydrogenation, a reaction product which forms, after acetylation with acetic anhydride and pyridine at room temperature, in addition to the 3-acetoxy-11-hydroxy-cholanic acid methyl-ester, M. Pt. 146–148° C., the ester which is stereoisomeric in 3 position and shows a M. Pt. of 141–142° C., and a specific rotation [α]$_D^{20}$ = +50° (acetone).

Instead of using Δ$^{11,12}$-3-keto-cholenic acid methyl-ester as a starting material, also Δ$^{11,12}$-3-acetoxy-etio-cholenic acid methyl-ester may be converted to the corresponding 11,12-oxide which is subsequently reduced to the 11-hydroxy compound or isomerized to the 3-keto compound. The conversion of the Δ$^{11,12}$-3-acetoxy-etio-cholenic acid methyl-ester to the 11,12-oxide is performed as follows:

215 mg. of Δ$^{11,12}$-3-acetoxy-etio-cholenic acid methyl-ester, melting point 99–100° C. (obtained as described in U. S. Patent No. 2,387,706), are dissolved in 15 cc. acetone. To this solution one of 150 mg. of bromoacetamide in 4 cc. of water is added and the whole allowed to stand for 16 hours at room temperature. It is then diluted with water, the acetone evaporated off in vacuo and the residue extracted with ether. The ether solution is washed with sodium carbonate solution and water, dried over sodium sulphate and evaporated down. The residual crude product is recrystallized from ether. It consists of a halo-hydrin, melting point 218–222° C., of the formula

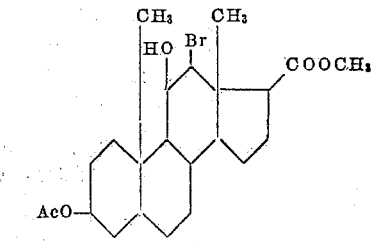

This halo-hydrin is converted by treatment with aluminium oxide into the α-oxide, which has the formula

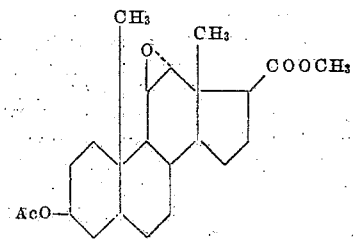

and which on reduction with the acid of a Raney catalyst yields the 11-hydroxy compound with the formula

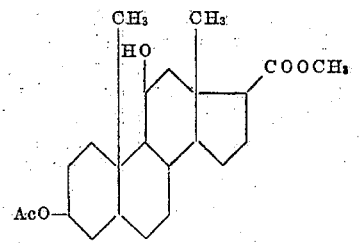

and on isomerization yields the 11-keto compound with the formula

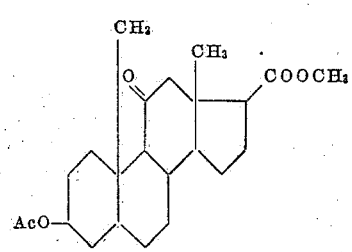

This application is a division of my application Serial No. 474,726, filed February 4, 1943 (now U. S. Pat. No. 2,403,683).

What I claim is:

1. A cyclopentanopolyhydrophenanthrene containing an oxidic oxygen attached to the carbon atoms 11 and 12.

2. A cyclopentanopolyhydrophenanthrene containing an oxidic oxygen attached to the carbon atoms 11 and 12, and at the carbon atom 3 a member of the group consisting of an acyloxy group and a ketonic oxygen.

3. A cholane containing an oxidic oxygen attached to the carbon atoms 11 and 12.

4. A cholane containing an oxidic oxygen attached to the carbon atoms 11 and 12, and at the carbon atom 3 a member of the group consisting of an acyloxy group and a ketonic oxygen.

5. In a process for the manufacture of a cyclopentanopolyhydrophenanthrene containing a keto-group in 11-position, starting from a cyclopentanopolyhydrophenanthrene containing a double bond between the carbon atoms 11 and 12, the steps comprising acting on an unsaturated $\Delta^{11,12}$-cyclopentanopolyhydrophenanthrene with a hypohalogenous acid, resulting in the formation of a 12-halogeno-11-hydroxy-cyclopentanopolyhydrophenanthrene, and treating the product with a dehydrohalogenating agent whereby hydrohalogenic acid is split off and an 11,12-oxido compound is formed.

TADEUS REICHSTEIN.

REFERENCES CITED

The following references are of record in the file of this patent:

UNITED STATES PATENTS

| Number | Name | Date |
|---|---|---|
| 2,265,143 | Butenandt | Dec. 9, 1941 |
| 2,323,277 | Miescher | June 29, 1943 |